United States Patent [19]

Gershberg et al.

[11] 3,947,834

[45] Mar. 30, 1976

[54] DOPPLER PERIMETER INTRUSION ALARM SYSTEM USING A LEAKY WAVEGUIDE

[75] Inventors: David N. Gershberg, Rockville, Md.; Alex Y. Lee, Arlington; Clair F. Parker, Jr., Fairfax, both of Va.

[73] Assignee: E-Systems, Inc., Dallas, Tex.

[22] Filed: Apr. 30, 1974

[21] Appl. No.: 465,677

[52] U.S. Cl............. 340/258 A; 333/84 L; 343/7.7
[51] Int. Cl.²......................................... G08B 13/18
[58] Field of Search ......... 340/258 A, 276; 343/7.7; 333/84 L

[56] References Cited
UNITED STATES PATENTS

| | | | |
|---|---|---|---|
| 2,355,395 | 8/1944 | Rubenstein ........................ | 340/276 |
| 3,560,970 | 2/1971 | Kamimura et al. ................. | 333/84 L |
| 3,618,083 | 11/1971 | Burley et al. ..................... | 340/258 A |
| 3,795,915 | 3/1974 | Yoshida ............................ | 333/84 L |
| 3,796,989 | 3/1974 | Ravas et al. ....................... | 343/7.7 |
| 3,810,186 | 5/1974 | Nakahara et al. .................. | 333/84 L |
| 3,838,408 | 9/1974 | McMaster ......................... | 340/258 A |
| 3,845,461 | 10/1974 | Foreman ........................... | 343/7.7 |

*Primary Examiner*—Glen R. Swann, III
*Attorney, Agent, or Firm*—Robert V. Wilder

[57] ABSTRACT

A flexible line distributed antenna, defining a perimeter of interest, radiates energy supplied from a transceiver. Motion around the flexible line causes the reflected energy which is intercepted by the flexible distributed antenna to be coupled back to the transceiver as a doppler frequency for processing in an alarm system. Reflected energy from the antenna to the transceiver is amplified and rectified into a DC voltage. This DC voltage is integrated to produce a time varying signal to a level detector that responds to a predetermined value of the integrated DC voltage. A response by the level detector provides an actuating signal to an alarm indicator through alarm logic. Ambient conditions around the extended flexible line distributed antenna are monitored by external sensors having outputs for controlling amplifier gain and triggering the alarm logic. For improved motion detection reliability, reflected energy from the antenna is coupled to a transceiver providing two output signals. These two output signals are processed separately for coupling to a voltage comparator driving an alarm indicator through alarm logic.

28 Claims, 5 Drawing Figures

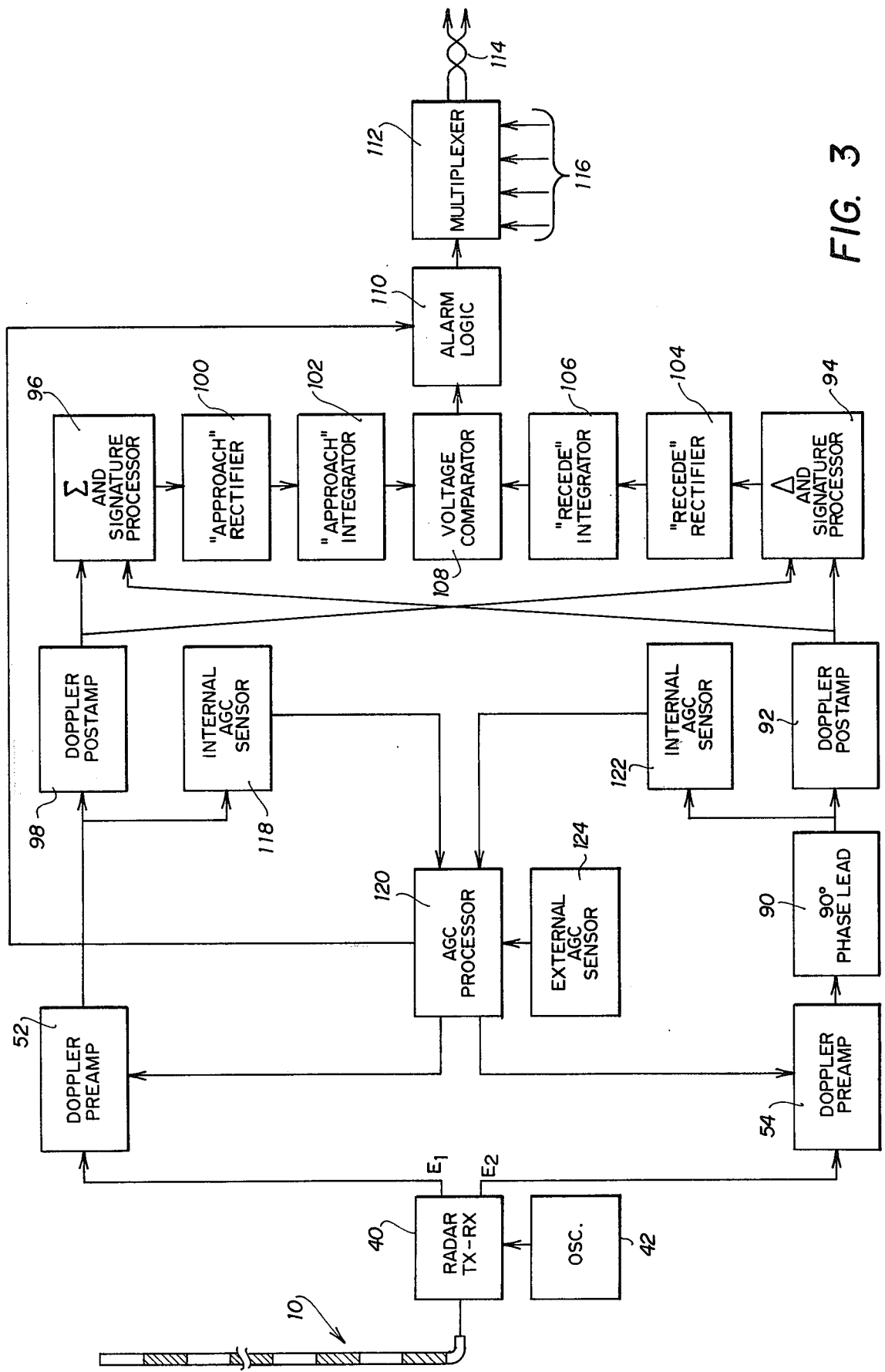

DOPPLER PERIMETER INTRUSION ALARM SYSTEM USING A LEAKY WAVEGUIDE

BACKGROUND OF THE INVENTION

This invention relates to perimeter intrusion alarm systems, and more particularly to such systems using microwave energy transmitted and reflected to a monostatic antenna for motion detection.

Intrusion detecting devices and systems utilizing microwave energy are known. Many such devices and systems utilize transmission antennas and reflectors positioned to define a perimeter of interest. Such a series of antennas and reflectors requires elaborate installation and accurate alignment to insure reasonably reliable intrusion detection. Heretofore, many presently available systems did not provide the expected detection reliability because of the ease with which an intruder was able to compromise the system. The detection reliability of presently available systems is further reduced by the effects of ambient conditions that cause a disruption of a transmitted energy wave.

A feature of the present invention is to provide a perimeter intrusion alarm system utilizing a flexible distributed antenna. This flexible antenna is relatively easy to deploy around any given perimeter segment of interest. Operation of the antenna insures that the energy therefrom is confined to a narrow zone about the protected perimeter segment, thereby permitting authorized activities beyond the protected zone without causing false alarms. As a further feature of the flexible distributed antenna, detection is extended across perimeter gaps (such as open gates, driveways, etc.) by means of end lobe energy transmitted from the antenna.

Another feature of the present invention is to provide a perimeter intrusion alarm system wherein a flexible distributed antenna is connected to a transceiver providing balanced quadrature mixing. Two doppler frequency outputs from the mixer are processed into single sideband "approach" and "recede" signals to reduce the false alarm rate. These "approach" and "recede" signals are processed through a voltage comparator to trigger an alarm indicator when the differential of the two signals exceeds a given level.

Still another feature of the present invention is that actual radiated energy flow is set up perpendicularly to the direction of the perimeter area of interest. Hence, an intruder cannot approach the protected segment without generating a true doppler signal. By contrast, certain other prior art systems (Gaubau lines, etc.) utilize a guided energy flow moving along the direction of the perimeter segment. Consequently, only components of intruder motion parallel to the perimeter segment generate true doppler signals. The implication is that a knowledgeable intruder has a better chance of defeating systems of this prior art type.

Since false alarms tend to be the greatest single problem in perimeter alarm systems, yet another feature of the present invention is the processing technique for reducing the false alarm rate. An approaching or receding intruder of the perimeter segments produces a single sideband return either above or below a transmitted frequency. False alarm sources, such as blowing trees, vibrating fences, etc., tend to produce double sideband returns and this single sideband technique is utilized to enhance the legitimate intruder signals. However, provisions are made to alarm on abnormally high noise levels produced by these ambient conditions to prevent "jamming" by an intruder.

One class of motion detection systems employs a sensitive receiver in conjunction with a transmitter to receive and measure an electric field. If an intruder or foreign object disturbs the electric field, there results a variation in the field strength which is detected by the receiver and used to trigger an indicator or alarm system. Another class of motion detection systems is the space alarm system characterized by the transmitting of energy into a specified space to be protected, or the space surrounding an object to be detected, and subsequently receiving that portion of the transmitted energy that is reflected by the surroundings. An alarm is triggered upon the detection of a disturbance, i.e., a frequency change, in the reflected energy caused by an intruder within the area. Any frequency change of the reflected energy, as compared to the transmitted energy, will indicate an object is moving within the area being monitored. This is the principle of operation of the well-known "doppler" effect. This type of system detects a doppler frequency shift in radiation reflected by moving objects within a specified area and the present invention utilizes the "doppler" effect.

A drawback of many microwave doppler type of intrusion detectors is the need for expensive and complex systems utilizing separate transmit and receive antennas for protection of extended areas or, if a single antenna is used, expensive duplexor networks are used to protect the receiver from damage by the high power signals being transmitted. The microwave doppler system of the present invention utilizes a single transmit/receive (monostatic) antenna in conjunction with miniaturized RF circuitry to provide balanced doppler mixing without complex radio frequency devices.

SUMMARY OF THE INVENTION

In accordance with the present invention, an antenna for a perimeter intrusion alarm system for detecting motion includes a center conductor extending around a selected perimeter and having one end connected to the motion detection system and energized by an excitation frequency. An outer conductor coaxially spaced with respect to the center conductor includes a plurality of groups of radiation slots to expose the center conductor. These groups of radiation slots are spaced along the outer conductor at distances related to the excitation frequency of the motion detection system. Alternately, thin conducting sleeves may be placed around a slotted cable at various intervals.

In accordance with another embodiment of the invention, a perimeter intrusion alarm system includes a line antenna extending to define a perimeter of interest. A transceiver couples energy to the line antenna and responds to energy reflected therefrom to generate a doppler frequency signal. A circuit connected to the transceiver responds to the doppler frequency signal to generate a time varying voltage. This time varying voltage is used to actuate an alarm at a predetermined voltage level.

In accordance with yet another embodiment of the invention, a quadrature perimeter intrusion alarm system responds to energy from an antenna, wherein the energy relates to movement along a defined perimeter of interest. The antenna is coupled to a transceiver that supplies energy to the antenna and responds to energy reflected therefrom to generate first and second doppler frequency signals. One of these doppler frequency signals is phase shifted with respect to the other with both signals then connected to a summing network and a circuit for differentially combining the phase shifted doppler frequency signal and the second doppler frequency signal. The summing circuit provides an "approach" signal and the network for differentially combining the signals provides a "recede" signal both connected to individual integrators that provide an output to a voltage comparator. The voltage comparator responds to a predetermined differential between the approach and recede signals to actuate an alarm.

BRIEF DESCRIPTION OF THE DRAWINGS

A more complete understanding of the invention and its advantages will be apparent from the specification and claims and from the accompanying drawings illustrative of the invention.

Referring to the drawings:

FIG. 3 is a block diagram of a quadrature processing perimeter intrusion alarm system connected to a flexible distributed antenna;

DESCRIPTION OF THE PREFERRED EMBODIMENTS

Figure 1:
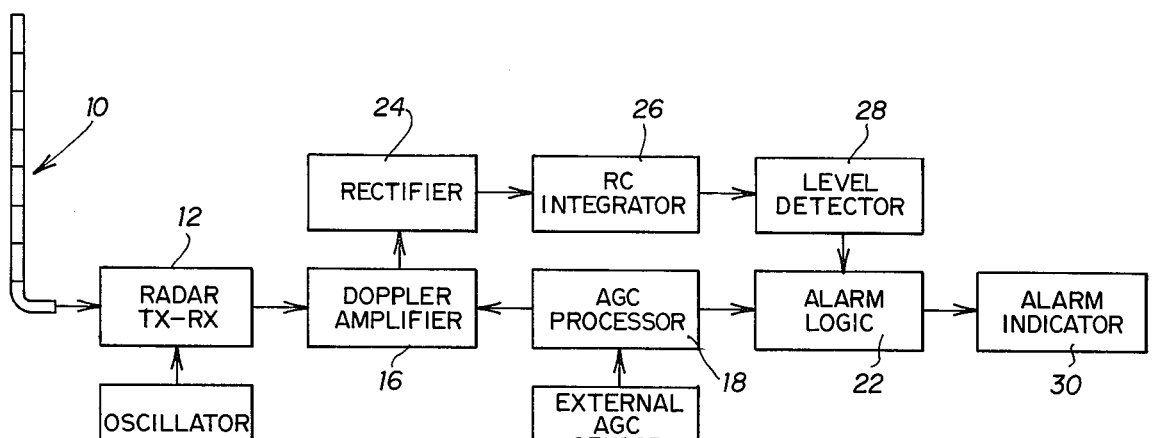
FIG. 1 is a block diagram of a single channel doppler intrusion alarm system utilizing a flexible distributed antenna.

Referring to FIG. 1, there is shown a block diagram of a microwave intrusion alarm system including a sensing antenna 10 of a flexible distributed line, for example, a coaxial cable or some equivalent thereof, such as a modified "TV twin lead" line. The antenna 10 extends to define a perimeter of interest and possible locations include around porch railings, across patio and door thresholds or across window sills. The antenna 10 transmits energy from and reflects energy to a transmit/receive transceiver 12, the latter also coupled to a microwave frequency oscillator 14. A doppler frequency signal from the transceiver 12 is applied to a doppler amplifier 16 having an automatic gain control network (not shown) in accordance with usual design practices. The automatic gain control network of the doppler amplifier 16 is activated in accordance with the output of an AGC processor 18 having an input coupled to an external AGC sensor 20.

The external AGC sensor 20 samples noise producing parameters in the vicinity of the antenna 10 and includes any one of a number of electronic transducers responsive to a particular parameter. Examples of such ambient conditions that will provide noise signals are fence vibration, wind rate, rain rate, along with movement of large shrubbery and trees. Noise signals produced by these ambient conditions, as sensed by the external AGC sensor 20, generate a signal to the AGC processor 18 to reduce the gain of the doppler amplifier 16. Excessive output signals from any one or all of the AGC sensors 20 will also cause the AGC processor 18 to drive alarm logic 22, to be explained, and hence any attempt to desensitize the system with noise (jamming) will initiate an alarm.

Signals from the doppler amplifier 16 are applied to a rectifier 24 that develops a unidirectional voltage from the doppler signal. An output from the rectifier 24 is applied to an RC integrator 26 to be amplified and smoothed (bandwidth limited) by the inherent low pass characteristic of the integrator. The output of the integrator 26 varies with time in accordance with the amplitude and duration of the signal received. When the output of the integrator 26 reaches a predetermined DC level, it triggers a level detector 28. Activating the level detector 28 provides a signal to the alarm logic 22 to turn on an alarm indicator 30. As mentioned, the alarm logic 22 also receives an input from the AGC sensor 18 to activate the alarm indicator 30 by an excessive noise signal from the external AGC sensor 20.

Figure 2:
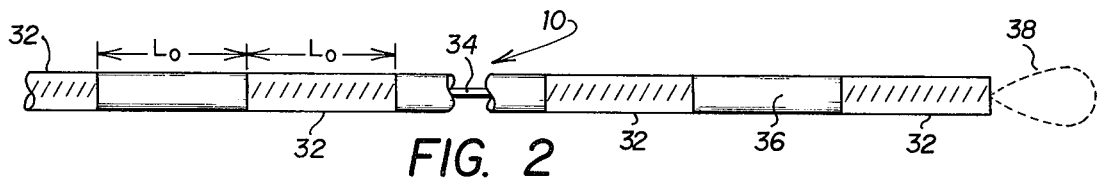
FIG. 2 is an enlarged view of the flexible distributed antenna with equally spaced groups of radiation slots for energy distribution.

Referring to FIG. 2, there is shown an enlarged view of the antenna 10 which comprises basically a flexible coaxial transmission line with short transverse slots cut through the outer conductor. The slots are arranged in groups 32, with the slots of each group spaced along the length of the cable. For protection, an overall jacket of polyethelene (not illustrated) encloses the outer conductor. The slot dimensions and spacing of each group are small with respect to the operating wavelength as established by the output of the oscillator 14 so that resonance effects are minimized.

Radiation from a single slot of each of the groups 32 may be visualized from the position of an external observer that "sees" a short section of the center conductor 34 carrying the cable current from the transceiver 12. The observer also "sees" most of the inner surface of the outer conductor 36 behind the slot. This inner surface of the outer conductor carries a net current equal to that flowing in the center conductor 34, but 180° out of phase. Thus, the observer "sees" a net effect of zero current except that the slot presence affects current flow on the inner surface of the outer conductor so that the total cancellation current will not be "seen". Also, the observer's 180° phase difference is upset slightly by the finite spacing between the inner conductor 34 and the outer conductor 36. The overall result is that an observer does "see" a net current attributable to current flow in the section of the center conductor, except that a magnitude factor much less than unity is imposed.

Considering that the spacing between slots of each group 32 is small compared to the wavelength of the excitation frequency, the cable antenna 10 may be treated as a single antenna conductor carrying a traveling current wave, i.e., the fractional magnitude of center conductor current "seen" through the slots. The magnitude of this current wave is essentially constant along any selected short cable section, since the internal cable wave does not attenuate rapidly.

While the preceding qualitated analysis applies to direct radiation from the slots of each of the groups 32, another portion of cable radiation arises because the outer surface of the cable antenna 10 is a cylindrical conductor capable of supporting its own current wave. This produces the effect of two transmission lines, i.e., the coaxial transmission line and a transmission line represented by the outer surface of the conductor 36. The phase velocity of a wave on the outer surface of the conductor 36 approaches free space velocity, while the phase velocity of a wave inside the cable is reduced by the usual cable velocity factor. In this situation, the slots of each of the groups 32 provide coupling between the two transmission lines, such that energy may be transferred into the surface wave. Radiation from this surface wave has been experimentally shown to be a significant contribution to a total traveling wave when compared with the direct radiation from the slots.

Considering both the surface wave radiation and the direct radiation, the total traveling energy wave from the antenna 10 may be derived by coupled wave analysis. Neglecting attenuation and assuming loose coupling, the following function defines the traveling surface wave:

$$I = \left( \frac{4KI_0\beta_2}{(\beta_1^2-\beta_2^2)} e^{\frac{-J(\beta_1+\beta_2)x}{2}} \right) \sin\left[ \frac{(\beta_1-\beta_2)x}{2} \right] + \frac{jKI_0}{(\beta_1+\beta_2)}[e^{-jt}\beta_1 + \beta_2^{jt} e^{+j}\beta_2^{x} - e^{-j}\beta_2^{x}] \quad (1)$$

where, $I$ = surface wave, current in amperes,
$K$ = current coupling coefficient,
$I_0$ = coaxial cable current magnitude in amperes,
$\beta_1$ = propagation constant of a coaxial cable,
$\beta_2$ = propagation constant of a surface wave,
$x$ = distance along the cable from the transceiver 12 in meters, and
$L$ = total cable length of the antenna 10 in meters.

The above function consists of a sinusoidally growing and decaying traveling wave moving at an average propagation constant, plus a weak standing wave associated with surface propagation constant $\beta_2$. The energy in the traveling wave alternately grows and decays during alternate 90° portions of a sinusoidal multiplying function. Thus, one method for enhancing energy flow into the traveling wave involves suppresion of coupling during the 90° decay portions of the sinusoids.

Referring to FIG. 2, the slots of the groups 32 are distributed along the antenna 10 to take advantage of this suppression method for enhancement of energy transfer into the traveling wave. As shown, the groups 32 are uniformly distributed along the length of the antenna 10 so that coupling is suppressed over the decay portions of the sinusoids. This requires that the distribution be determined in accordance with the equation:

$$L_o = \frac{\pi}{(\beta_1 - \beta_2)} \quad (2)$$

where, $L_o$ = the length of the groups 32 and the spacing between groups.

As a modification to the uniform suppression distribution of the groups 32, a nonuniform suppression distribution may provide greater enhancement of energy transfer into the traveling wave. By use of distributed groups of slots along the length of the antenna 10, energy transferred into the antenna from the transceiver 12 displays a more uniform distribution along the antenna.

An alternate method for launching strong surface waves on the cable involves placing thin conducting sleeves tightly around the cable jacket at various points along its length. The sleeve, polyethelene cable jacket, and slotted outer cable conductor act as an auxiliary coaxial cable section which is coupled to the main cable by virtue of the slots. By making the sleeves of resonant length, voltages developed at ends of the sleeves launch traveling waves on the cable surface.

In operation of the system of FIG. 1, a transmission frequency from the oscillator 14 is applied through the transceiver 12 to the distributed line antenna 10. Energy transmitted to the antenna 10 produces a traveling wave along the length of the antenna and an energy lobe radiating from the antenna as illustrated at the reference numeral 38. This end lobe extends the intrusion perimeter across an open space not covered by the antenna cable itself.

Movement of an intruder along the antenna or through the end lobe 38 reflects energy back through the cable 34 and to the transceiver 12 to produce a doppler frequency output therefrom. This doppler frequency signal is amplified, rectified and integrated on a time basis and applied to the input of the level detector 28. When an input to the level detector 28 exceeds a preestablished level, the alarm logic 22 is activated to provide a signal to actuate the alarm indicator 30. Thus, energy reflected back through the antenna 10 by movement of an intruder into the traveling wave pattern actuates the alarm 30.

Referring to FIG. 3, there is shown a perimeter intrusion alarm system wherein sideband techniques are utilized to enhance the legitimate intruder signals over false alarm sources such as blowing trees, vibrating fences, etc. that tend to produce double sideband returns. The basic approach of the system centers around the fact that an approaching or receding intruder produces a single sideband radar return either above or below a transmitted frequency from the transceiver 40 to the distributed antenna 10. The transmitted frequency of the antenna 10 is provided by an oscillator 42.

Utilization of the sideband technique requires that quadrature mixing be used in the transceiver 40. Conventional monostatic transceivers usually employ a circulator to separate the transmitted and received signals. The receive signal is split equally by a matched 90° hybrid and fed to a pair of balance mixers. Local oscillator power for the mixer is obtained from the transmitter by means of a directional coupler, followed by a zero degree two way power divider. The transceiver 40 of FIG. 3 achieves balanced quadrature mixing without the need for a circulator, 90° hybrid, directional coupler or power splitter.

Figure 4:
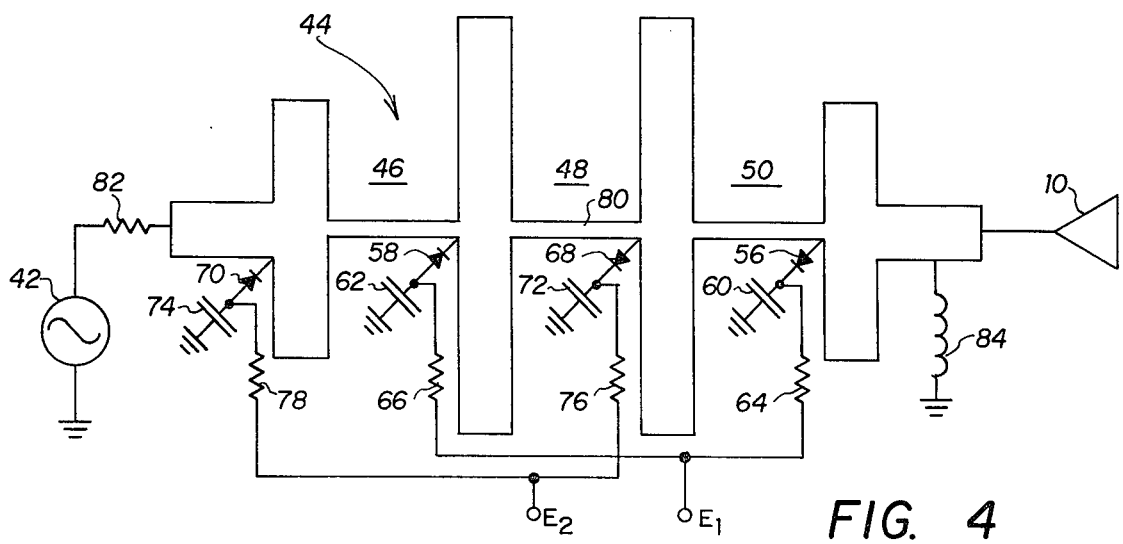
FIG. 4 is a schematic of a microstrip balanced quadrature mixer as used in the transceiver of FIG. 3.

Referring to FIG. 4, the transceiver 40 is shown fabricated by the use of microstrip techniques. The transceiver mixer 44 employs a symbolic "H" microstrip structure to miniaturize the assembly, reduce false alarm, and improve reliability and provide greater economy. Operation of the mixer 44 may best be understood by splitting the configuration into three "half inverter" networks designated by the reference numbers 46, 48 and 50. The mixer 44 produces two output signals, doppler frequency signal $E_1$ coupled to a doppler preamplifier 52 and doppler frequency signal $E_2$ coupled to a doppler preamplifier 54. The doppler frequency signal $E_1$ is obtained from detector diodes 56 and 58. The diode 56 is in series with a capacitor 60 and the diode 58 is in series with a capacitor 62. Connected to each junction of diode and capacitor is a resistor 64 and 66, respectively, interconnected to the terminal for the output $E_1$. The doppler frequency signal $E_2$ is derived from diodes 68 and 70 with the former in series with a capacitor 72 and the latter in series with a capacitor 74. Resistors 76 and 78 are interconnected to the terminal for the output $E_2$ and also connected to the diodes 68 and 70, respectively.

Microwave transmission frequencies from the oscillator 42 are applied to the "H" microstrip line 80 through a resistor 82. Tied to the output of the microstrip line 80 is the antenna 10 and an inductance coil 84. Coupled to the junction of line stubs in the main transmission line of the "H" microstrip line 80 are the peak detector diodes 56 and 58 for providing the doppler frequency signal $E_1$. The detector diode 56 functions as a mixer to pass doppler frequency signals through the resistor capacitor network including the resistor 64 and the capacitor 60. This is a so-called doppler frequency produced by movement in the traveling wave field of the antenna 10. The detector diode 58 also functions as a mixer to pass a phase inverted doppler frequency signal through the resistance capacitance network including the resistor 66 and the capacitor 62. Similarly, the detector diode 68 operates as a mixer to pass a doppler frequency signal to the resistor capacitor network including the resistor 76 and the capacitor 72 to provide the doppler frequency signal $E_2$. The detector diode 70 is a mixer to pass a phase inverted frequency signal to the resistance capacitance network including the resistor 78 and the capacitor 74.

The transmission frequency from the oscillator 42 is applied to the input terminal of the balanced mixer 44 which may best be understood in operation by treating a moving target within the traveling wave in terms of a time-varying impedance reflected thereby back into the antenna 10. Such an approach is considered valid so long as the target speed is negligible with respect to the velocity of wave propagation. For intrusion alarm systems, this is hardly a problem. Physically, a target creates a weak spatial VSWR pattern which is dragged along as it moves. This pattern couples into the microwave antenna 10 as a time-varying impedance.

Figure 5:
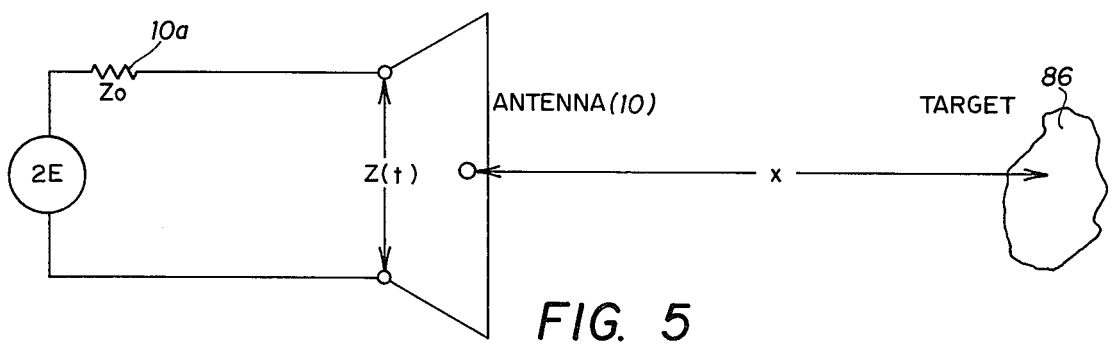
FIG. 5 is an equivalent circuit of a microwave monostatic system illustrating that a matched antenna presents a resistive load with no target present.

With reference to the equivalent circuit of FIG. 5, the microwave antenna 10 presents a resistive load 10a ($Z_o$) with no target present. If the antenna terminal voltage of the transmitted wave is represented by E and the antenna terminal voltage of a target return wave given by V, the microwave range equation is as follows:

$$V = \frac{EG\lambda \sqrt{\sigma}}{(4\pi)^{3/2} x^2} e^{\frac{-j4\pi x}{\lambda}} \quad (3)$$

where
 $x$ = distance between the antenna 10 and a target 86,
 $\sigma$ = microwave cross section of the target 86,
 $\lambda$ = operating wavelength of the system, and
 $G$ = the gain of the antenna 10.

The time-varying terminal impedance $Z(t)$ of the antenna 10 may be derived from the equation;

$$Z(t) = \frac{Z_o(1 + \Gamma)}{(1 - \Gamma)} \quad (4)$$

where $$\Gamma = \frac{V}{E} = \frac{G\lambda \sqrt{\sigma}}{(4\pi)^{3/2} x^2} e^{\frac{-j4\pi x}{\lambda}} \quad (5)$$

If the target 86 moves at a speed S then:

$$x = St \quad (6)$$

and $$e^{\frac{-j4\pi x}{\lambda}} = e^{-j2\pi \left(\frac{2S}{\lambda}\right) t} \quad (7)$$

where the term $2S/\lambda$ is the expression for doppler frequency.

Returning to the general case of time-varying impedances, the net radio frequency voltage "B" across the terminal impedance $Z(t)$, see FIG. 5, is given by the equation:

$$B = \frac{2EZ(t)}{[Z_o + Z(t)]} \quad (8)$$

Solving this equation for the present impedance $Z(t)$ results in:

$$B = E \left[ 1 + \frac{G\lambda \sqrt{\sigma}}{(4\pi)^{3/2} S^2 t^2} e^{-j\omega t} \right] \quad (9)$$

where $\omega = 2\pi$ times the doppler frequency.

From the equation (9), a doppler output frequency is obtained from the detector diode 56 which produces a voltage proportional to the absolute magnitude of the radio frequency voltage B. At the diode 56 an output is produced as given by the expression:

$$|B| \alpha E \left[ 1 + \frac{G\lambda \sqrt{\sigma}}{(4\pi)^{3/2} S^2 t^2} \cos \omega t \right] \quad (10)$$

This expression contains a DC level signal with a weak amplitude modulation at the doppler frequency imposed thereon. The modulation intensity is inversely proportional to $S^2 t^2$, which is the normal range attenuation for microwave signals.

In most intrusion alarm systems of the doppler frequency type, the doppler signals must be amplified on the order of 90 db to bring it to a usable level. Since the DC level of the detector 56 can be several volts, capacitive coupling is employed between the detector 56 and the doppler amplifier chain including the preamplifier 52. This prevents DC saturation of the amplifier chain, however, it does not isolate amplifiers 98 from a time variation of the DC voltage level. Such a variation arises from amplitude modulation and noise on the oscillator 42 and can produce false alarms.

To minimize the effects of DC level variation, the detector diode 58 is connected to the microstrip network 80 and interconnected with the detector diode 56. This cancels out the DC voltage at the terminal $E_1$ to provide balanced mixing. It follows, that the doppler frequency signals will also cancel out unless the doppler output of the diode detector 58 is phase inverted with respect to the output of the diode detector 56. In the balanced mixer of FIG. 4, this is accomplished by connecting the detector diode 58 across the transformed radio frequency impedance $Z'(t)$ in accordance with the equation:

$$Z'(t) = \frac{Z_o^2}{Z(t)} \quad (11)$$

This transformation is performed by a four terminal radio frequency network known as an impedance inverter.

Returning to FIG. 4, the "H" structure is a pseudo-lumped LC impedance inverter network. The diodes at the input and output of the network operate as high impedance detectors and draw very little RF current. Hence, they may be neglected as far as their effect on the RF impedance is concerned. Since $Z(t)$ and $Z'(t)$ reduce to $Z_0$ with no target present along the antenna 10, the RF voltage magnitude is the same at all diodes resulting in minimal DC levels at the output terminals $E_1$ and $E_2$, resulting in DC levels out of both detectors.

With specific reference to the output terminal $E_2$, the operation of the "H" microstrip mixer and the detector diodes 68 and 70 is similar as heretofore explained with regard to the diode detectors 56 and 58. This produces the equal DC levels out of the mixer 44 at the terminals $E_1$ and $E_2$ with no target present at the antenna 10.

The quadrature doppler frequency signals $E_1$ and $E_2$ are processed first in the preamplifiers 52 and 54, respectively. An output from the doppler preamplifier 54 is advanced by 90° in a phase shift network 90. This phase shifted signal is then applied to a doppler postamplifier 92 that generates an output signal coupled to a differential signature processor 94 and a summing signature processor 96. Also connected to the processors 94 and 96 is the output of a doppler postamplifier 98 receiving the output of the preamplifier 52.

In the summing processor 96 the signals from the postamplifiers 92 and 98 are summed to provide an "approach" signal that is a maximum for approaching intruders to the antenna 10 and at a zero level for receding intruders from the antenna 10. This "approach" signal is applied to a rectifier 100 and integrated with respect to time in an "approach" integrator 102. Likewise, the two voltages from the postamplifiers 92 and 98 are differentially combined in the differential processor 94 to provide a "recede" signal that is a maximum for an intruder receding from the antenna 10 and at a zero level for an intruder approaching the antenna. This differential output from the processor 94 is applied to a rectifier 104 and then to a "recede" integrator 106.

A voltage comparator 108 receives the outputs of the integrators 102 and 106. When the differential between the "approach" and "recede" signals exceed a preset unbalance, an output is generated by the comparator 108 to alarm logic 110. The alarm logic 110 responds to the output of a comparator 108 to provide an alarm signal through a multiplexer 112 to a communication line 114 connected to a remote alarm station of conventional design (not shown).

Additional perimeter intrusion alarm systems, as shown in FIG. 3, are connected to the multiplexer 112 over each of the lines 116. Each of these additional systems includes a distributed line antenna and the individual systems when operating as a combined system provide intrusion alarm protection over an extended perimeter. By utilizing well-known multiplexer techniques, a monitor at the alarm station easily recognizes which of the individual systems connected to the multiplexer 112 is producing an alarm signal from alarm logic. Thus, the particular location of an intruder is identifiable.

Considering the system of FIG. 3, a single sideband intruder signal, such as generated by an intruder approaching the antenna 10, will actuate only one of the integrators 102 or 106 and trigger the comparator 108. Double sideband false alarm signals, such as produced by surrounding parameters, tend to actuate both integrators 102 and 106 together such that the comparator 108 is not triggered.

In addition to driving the postamplifier 98, an output from the preamplifier 52 also drives an internal AGC sensor 118. Excessive noise signal levels out of the preamplifier 52 activate the sensor 118 to drive an AGC processor 120. The AGC processor 120 connects to the preamplifier 52 to reduce the gain thereof in accordance with the output of the sensor 118. Likewise, an output of the preamplifier 54, as phase shifted in the network 90, is applied to an internal AGC sensor 122 also driving the AGC processor 120. Thus, the output of the processor 120 also adjusts the gain of the preamplifier 54 in accordance with the output of the sensor 122.

Also coupled to the AGC processor 120 is an external AGC sensor 124 that samples such surrounding parameters as fence vibration, wind speed, rain rate or other external noise parameters pertinent to the installation of the antenna 10. Thus, the block identified as AGC sensor 124 may incorporate one or more sensors responsive to various external noise parameters. At a predetermined level of each of the measured parameters, the external AGC sensor 124 drives the AGC processor 120 to reduce the gain of the preamplifiers 52 and 54. This desensitizes the system to reduce the false alarm rate.

Excessive output signals from any of the sensors 118, 122 or 124 causes the AGC processor 120 to generate a signal to the alarm logic 110. This triggers the alarm monitor through the multiplexer 112 as explained. Hence, any attempt to desensitize the system with noise (jamming) will initiate an alarm.

While several embodiments of the invention, together with modifications thereof, have been described in detail herein and shown in the accompanying drawings, it will be evident that various further modifications are possible without departing from the scope of the invention.

What is claimed is:

1. An antenna for use with a system for detecting motion through a perimeter, comprising in combination:
    a center conductor extending to define a perimeter of interest and having one end arranged to be connected to the motion detecting system and energized by an excitation frequency; and
    an outer conductor coaxially spaced with respect to the center conductor,
    said outer conductor including a plurality of groups of radiation slots to expose the center conductor and thereby enhance radiation along the outer conductor,
    the groups spaced along the outer conductor at distances related to the excitation frequency of the motion detecting system.

2. An antenna in a system for detecting motion as set forth in claim 1 wherein the slot spacing within each group varies with the wavelength of the excitation frequency of the motion detecting systems.

3. An antenna in a system for detecting motion as set forth in claim 1 wherein radiation enhancement is provided by radiation slots of the outer conductor spaced in groups according to:

$$L_o = \frac{\pi}{(\beta_1 - \beta_2)}$$

where $L_o$ = length of groups and space between groups,
$\beta_1$ = a propagation constant of the coaxially spaced conductors, and
$\beta_2$ = a propagation constant of a surface wave on the outer conductor.

4. An antenna in a system for detecting motion as set forth in claim 1 wherein radiation enhancement is provided by placing thin conducting sleeves around the slotted cable at selected intervals.

5. An antenna in a system for detecting motion as set forth in claim 1 wherein the end of the center conductor opposite the end connected to the motion detecting system radiates energy in a direction substantially axially aligned with the center conductor.

6. A perimeter intrusion alarm system, comprising in combination:
a line antenna extending to define a perimeter of interest;
a transceiver for coupling energy to said line antenna and receiving energy reflections therefrom to generate a doppler frequency signal;
circuit means responsive to the doppler frequency signal to generate a time varying signal; and
alarm means actuated by a signal of a predetermined magnitude generated by said circuit means.

7. A perimeter intrusion alarm system as set forth in claim 6 wherein said circuit means includes a doppler amplifier interconnected to said transceiver for amplifying the doppler frequency signal.

8. A perimeter intrusion alarm system as set forth in claim 7 wherein said doppler amplifier includes an automatic gain control, and further including:
an auxiliary sensor responsive to a selected surrounding parameter to generate a signal to said doppler amplifier to vary the gain thereof in accordance with the selected parameter.

9. A perimeter intrusion alarm system as set forth in claim 8 including means responsive to said auxiliary sensor generated signal to actuate said alarm means at a predetermined level of the selected parameter.

10. A perimeter intrusion alarm system as set forth in claim 6 wherein said line antenna includes:
a center conductor extending to define the perimeter of interest and having one end connected to said transceiver, and
an outer conductor coaxially spaced with respect to the center conductor,
said outer conductor including a plurality of groups of radiation slots to expose the center conductor and thereby enhance radiation along the outer conductor,
the groups spaced along the outer conductor at distances related to the excitation frequency from said transceiver.

11. A perimeter intrusion alarm system as set forth in claim 10 wherein the slot spacing of each group varies with the wavelength of the excitation frequency.

12. A perimeter intrusion alarm system as set forth in claim 10 wherein radiation enhancement is provided by radiation slots of the outer conductor spaced in groups according to:

$$L_o = \frac{\pi}{(\beta_1 - \beta_2)}$$

where
$L_o$ = length of groups and space between groups,
$\beta_1$ = a propagation constant of the coaxially spaced conductors, and
$\beta_2$ = a propagation constant of a surface wave on the outer conductor.

13. A perimeter intrusion alarm system as set forth in claim 10 wherein radiation enhancement is provided by placing thin conducting sleeves around the slotted cable at selected intervals.

14. A quadrature perimeter intrusion alarm system responsive to energy from an antenna, wherein the energy varies with movement along a defined perimeter of interest, the combination comprising:
a transceiver for coupling energy to said antenna and receiving energy therefrom to generate first and second doppler frequency signals;
phase shift means responsive to one of said doppler frequency signals to shift the phase thereof relative to the second doppler frequency and having a phase shifted doppler frequency signal output;
means for summing the phase shifted doppler frequency signal with the second doppler frequency signal to provide an approach signal;
means for differentially combining the phase shifted doppler frequency signal and the second doppler frequency signal to provide a recede signal; and
alarm means actuated by a difference between the approach signal and the recede signal greater than a predetermined magnitude.

15. A quadrature perimeter intrusion alarm system as set forth in claim 14 including a doppler amplifier for the first doppler frequency signal and a second doppler amplifier for the second doppler frequency signal, said amplifiers interconnected to said transceiver to provide amplified signals at outputs thereof.

16. A quadrature perimeter intrusion alarm system as set forth in claim 15 wherein said doppler amplifiers each include an automatic gain control, and further including:
an auxiliary sensor responsive to a selected surrounding parameter to generate a signal to each of said doppler amplifiers to vary the gain thereof in accordance with the selected parameter.

17. A quadrature perimeter intrusion alarm system as set forth in claim 16 including means responsive to said auxiliary sensor to generate a signal to actuate said alarm means at a predetermined level of the selected parameter.

18. A quadrature perimeter intrusion alarm system as set forth in claim 14 wherein said means for summing and said means for differentially combining each includes an integrator responsive to an input signal to generate a time varying signal varying with the approach signal and the recede signal, respectively.

19. A quadrature perimeter intrusion alarm system as set forth in claim 18 wherein said alarm means includes a voltage comparator responsive to the time varying signals from the integrator of the means for summing and the integrator of the means for differentially combining to produce an alarm signal when the difference between the two time varying signals exceeds a predetermined differential magnitude.

20. A quadrature perimeter intrusion alarm system as set forth in claim 19 wherein said alarm means includes:
- a multiplexer for sequentially interconnecting one of a plurality of alarm signals to a central alarm station.

21. A quadrature perimeter intrusion alarm system, comprising in combination:
- a line antenna extending to define a perimeter of interest;
- a transceiver for coupling energy to said antenna and receiving energy therefrom to generate first and second doppler frequency signals;
- phase shift means responsive to one of said doppler frequency signals to shift the phase thereof relative to the second doppler frequency and having a phase shifted doppler frequency signal output;
- means for summing the phase shifted doppler frequency signal with the second doppler frequency signal to provide an approach signal;
- means for differentially combining the phase shifted doppler frequency signal and the second doppler frequency signal to provide a recede signal; and
- alarm means actuated by a difference between the approach signal and the recede signal greater than a predetermined magnitude.

22. A quadrature perimeter intrusion alarm system as set forth in claim 21 including a doppler amplifier for said first doppler frequency signal and a doppler amplifier for the second doppler frequency signal, said doppler amplifiers interconnected to said transceiver for amplifying the doppler frequency signals, each of said doppler amplifiers including an automatic gain control and further including:
- an auxiliary sensor responsive to a selected surrounding parameter to generate a signal to said doppler amplifiers to vary the gain thereof in accordance with the selected parameter.

23. A quadrature perimeter intrusion alarm system as set forth in claim 22 including means responsive to said auxiliary sensor generated signal to actuate said alarm means at a predetermined level of the selected parameter.

24. A quadrature perimeter intrusion alarm system as set forth in claim 23 wherein said means for summing and said means for differentially combining each includes an integrator responsive to the approach signal and the recede signal, respectively, and said alarm means includes a voltage comparator responsive to the outputs of the integrator of said summing means and the integrator of said means for differentially combining to generate an alarm signal when the outputs of the integrator exceed a predetermined differential magnitude.

25. A quadrature perimeter intrusion alarm system as set forth in claim 24 wherein said line antenna includes:
- a center conductor extending around a selected perimeter and having one end connected to said transceiver and excited by a frequency therefrom; and
- an outer conductor coaxially spaced with respect to the center conductor;
- said outer conductor including a plurality of groups of radiation slots to expose the center conductor and thereby enhance radiation along the outer conductor;
- the groups spaced along the outer conductor at distances related to the excitation frequency from said transceiver.

26. A quadrature perimeter intrusion alarm system as set forth in claim 25 wherein the slots spacing in each group varies with the wavelength of the excitation frequency from said transceiver.

27. A quadrature perimeter intrusion alarm system as set forth in claim 26 wherein radiation enhancement is provided by radiation slots of the outer conductor spaced in groups according to:

$$L_o = \frac{\pi}{(\beta_1 - \beta_2)}$$

where
- $L_o$ = length of groups and space between groups,
- $\beta_1$ = a propagation constant of the coaxially spaced conductors, and
- $\beta_2$ = a propagation constant of a surface wave on the outer conductor.

28. A quadrature perimeter intrusion alarm system as set forth in claim 26 wherein radiation enhancement is provided by placing thin conducting sleeves around the slotted cable at selected intervals.

* * * * *